No. 615,683.  
F. DAY.  
BEARING FOR VEHICLE WHEELS.  
(Application filed June 25, 1896.)  
Patented Dec. 13, 1898.
(No Model.)
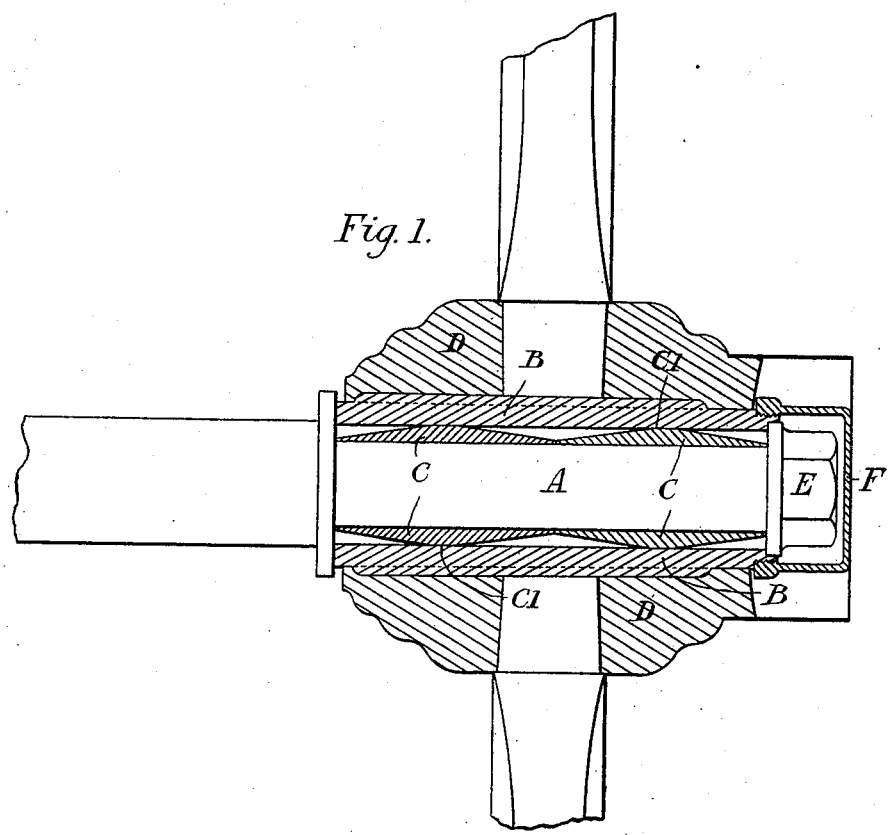
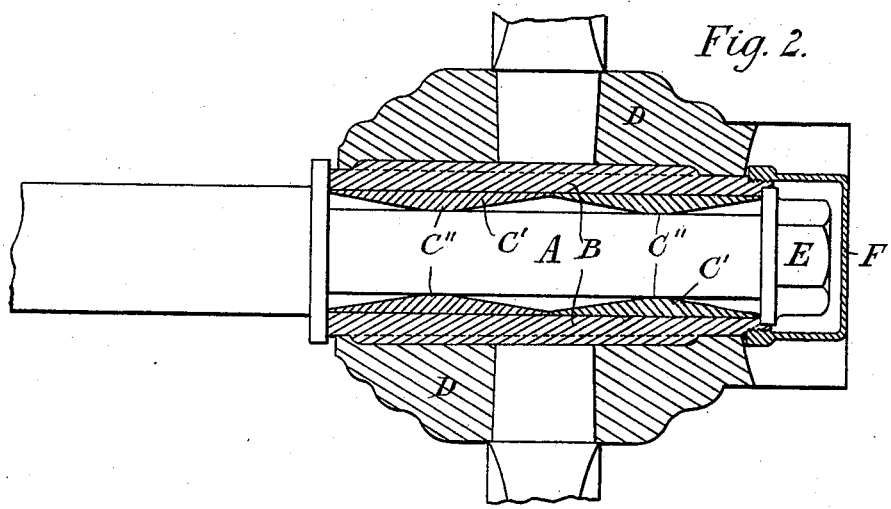
Witnesses  
Inventor  
Francis Day

UNITED STATES PATENT OFFICE.

FRANCIS DAY, OF LONDON, ENGLAND.

BEARING FOR VEHICLE-WHEELS.

SPECIFICATION forming part of Letters Patent No. 615,683, dated December 13, 1898.

Application filed June 25, 1896. Serial No. 596,903. (No model.)

*To all whom it may concern:*

Be it known that I, FRANCIS DAY, a subject of the Queen of England, residing at Camberwell, London, Surrey, England, have invented certain new and useful Improvements in or Relating to the Bearings for Vehicle-Wheels, of which the following is a specification.

This invention relates to certain new and useful improvements in journal-bearings; and it consists, substantially, in such features of construction, arrangement, and combinations of parts, as will hereinafter be more particularly described.

The object of the invention is simplicity of construction as well as reduction in friction and wear.

A further object is the facility with which the wearing-surfaces around the axle may be replaced when worn and to improve the efficiency of journal-bearings generally as applied to vehicle-wheels and similar contrivances.

These objects I attain by the means illustrated in the accompanying drawings, in which—

Figure 1 is a longitudinal sectional view, in part elevation, of my improved journal-bearing as employed in connection with the hub of an ordinary vehicle-wheel. Fig. 2 is a similar view representing a slight change or modification.

While I show my improved journal-bearing in a particular embodiment, it will be understood that the same may be used in connection with other forms of apparatus involving the use of spindles or journals which work or operate in closed bearings.

In Fig. 1 of the drawings, A represents the journal of an ordinary wagon-axle, and B is an ordinary axle-box located or arranged within the hub D in any suitable way. Preferably the said axle-box, as well as the hub, is retained in position upon the axle by means of the nut E screwing onto the end of the axle, and the said nut is inclosed by a dust-cap F screwing onto the end of the axle-box B in the usual manner.

Instead of bringing the friction and wear directly upon the journal or upon the axle-box for the entire length of either it is desirable while maintaining full and equal support throughout the full length of journal to reduce to a minimum the area of actual bearing or contact surface, and while this could be accomplished in different ways I have found that excellent results are to be derived from either one of the equivalent embodiments—such, for instance, as I have herein shown. Thus, as shown in Fig. 1 of the drawings, I interpose intermediate of the journal A and the box B one or more sleeves C, preferably two for each journal, as shown, and these sleeves are preferably of equal length, and in order to reduce the actual wear and bearing-surface between the same and the axle-box I taper each sleeve from the center toward each end, thereby imparting to it practically the shape of a double cone. In this way the enlarged or thickened central portions C' of the sleeves, being of a thickness equaling the space between the journal and inner surface of the box, may be caused to engage with the box in such manner that the hub will turn upon the sleeves and the sleeves remain in a fixed position relative to the journal, or the sleeves may be made to turn with the box upon the journal.

It is evident that each sleeve could be tapered a number of times throughout its length to constitute as many enlarged bearing portions C' as may be required for increased length of bearing-support; but for the purposes of an ordinary wagon-axle I have found that but two of such bearing portions C' are required, the preferable disposition being such that they lie at equal distances both from the ends and center of the journal, as well as a distance apart sufficient to effect good balance and working effect. It is evident, further, that instead of employing two separate sleeves for each journal the number thereof could be increased; or, if so desired, I might employ a single sleeve only, the same to be of a length equal to the two sleeves shown and provided in precisely the same way with at least two bearing portions or bands C', as a single bearing-band C' would permit the wheel to wabble on the axle and be wholly unsuitable as a bearing for a vehicle-wheel where only axial rotation is permissible. These are very obvious changes.

As shown in Fig. 2, I make the outer surfaces of the sleeves straight and form the tapered or conical portions thereof on the inner surfaces, so that the bearing of the band portions will be directly upon the journal itself instead of upon the inner surface of the axle-box. The construction in other respects is precisely the same with practically the same effect or results in use.

It is apparent that immaterial changes could be resorted to without departing from the general principles of the invention intended to be embraced.

Having thus described my invention, what I claim is—

In a journal-bearing, the combination with a journal and a box therefor, of interposed bearing-sleeves each tapered on one face in opposite directions toward the ends to form double cones, the thickened portions of the cones constituting separated bearing-points of relatively small area, substantially as and for the purpose described.

In witness whereof I have hereto affixed my hand in the presence of the two subscribing witnesses.

FRANCIS DAY.

Witnesses:
C. ROSE,
T. J. OSMAN.